US010140522B2

(12) United States Patent
Yao et al.

(10) Patent No.: US 10,140,522 B2
(45) Date of Patent: Nov. 27, 2018

(54) FULLY CONVOLUTIONAL PYRAMID NETWORKS FOR PEDESTRIAN DETECTION (71) Applicant: Intel Corporation, Santa Clara, CA (US)

(72) Inventors: Anbang Yao, Beijing (CN); Ruoyan Wang, Beijing (CN); Yurong Chen, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/300,490

(22) PCT Filed: Dec. 16, 2015

(86) PCT No.: PCT/CN2015/097534
§ 371 (c)(1),
(2) Date: Sep. 29, 2016

(87) PCT Pub. No.: WO2017/101036
PCT Pub. Date: Jun. 22, 2017

(65) Prior Publication Data
US 2018/0018524 A1 Jan. 18, 2018

(51) Int. Cl.
G06K 9/62 (2006.01)
G06K 9/00 (2006.01)
(Continued)

(52) U.S. Cl.
CPC ..... G06K 9/00771 (2013.01); G06K 9/00791 (2013.01); G06K 9/4628 (2013.01);
(Continued)

(58) Field of Classification Search
CPC ................. A45D 44/005; G06T 11/60; G06T 2207/10024; G06T 2207/30196
(Continued)

(56) References Cited

U.S. PATENT DOCUMENTS 5,990,901 A * 11/1999 Lawton ................. G06T 15/503
345/581
7,039,222 B2 * 5/2006 Simon ................ G06K 9/00234
348/606
(Continued)

FOREIGN PATENT DOCUMENTS

CN 104063719 A 9/2014
CN 104754311 A 7/2015

OTHER PUBLICATIONS

International Search Report for PCT/CN2015/097534, dated Sep. 14, 2016, 5 pages.
(Continued)

Primary Examiner — Yosef Kassa
(74) Attorney, Agent, or Firm — Womble Bond Dickinson (US) LLP (57) ABSTRACT A fully convolutional pyramid network and method for object (e.g., pedestrian) detection are disclosed. In one embodiment, the object detection system is a pedestrian detection system that comprises: a multi-scale image generator to generate a set of images from an input image, the set of images being versions of the input image at different scales; a human body-specific fully convolutional network (FCN) model operable to generate a set of detection results for each image in the set of images that is indicative of objects that are potentially of human bodies; and a post processor to combine sets of detection results generated by the FCN model for the set of images into an output image with each object location determined as potentially being a human body being marked.

24 Claims, 6 Drawing Sheets (51) Int. Cl.
 G06K 9/46 (2006.01)
 G06K 9/66 (2006.01)
 G06K 9/68 (2006.01)
(52) U.S. Cl.
 CPC ............. *G06K 9/6292* (2013.01); *G06K 9/66* (2013.01); *G06K 9/6857* (2013.01)
(58) Field of Classification Search
 USPC ............... 382/103, 157, 159, 170, 278, 282; 128/925; 706/15, 25
 See application file for complete search history.

(56) References Cited

U.S. PATENT DOCUMENTS

| | | | | |
|---|---|---|---|---|
| 7,082,211 B2* | 7/2006 | Simon | ................ | G06K 9/00281 358/531 |
| 7,529,428 B2* | 5/2009 | Yamada | ............. | G06K 9/00248 345/629 |
| 8,385,599 B2* | 2/2013 | Camus | ................ | G06K 9/00201 382/103 |
| 8,385,647 B2* | 2/2013 | Hawley | ................ | G06K 9/4633 358/453 |
| 8,452,778 B1* | 5/2013 | Song | .................. | G06K 9/00711 704/233 |
| 8,498,451 B1* | 7/2013 | Agopian | ........... | H04M 1/27455 382/118 |
| 8,538,081 B2* | 9/2013 | Ding | .................... | G06K 9/4642 382/103 |
| 8,706,663 B2* | 4/2014 | Nc | ..................... | G06K 9/00369 382/103 |
| 8,861,842 B2* | 10/2014 | Jung | .................. | G06K 9/00805 382/155 |
| 2008/0232698 A1 | 9/2008 | Shi et al. | | |
| 2008/0260239 A1 | 10/2008 | Han et al. | | |

OTHER PUBLICATIONS

Written Opinion of the International Searching Authority for PCT/CN2015/097534, dated Sep. 14, 2016, 4 pages.
Wang, et al., "Visual Tracking with Fully Convolutional Networks", 2015 IEEE International Conference on Computer Vision, Dec. 13-16, 2015, Santiago, Chile, pp. 3119-3127.
Felzenszwalb, et al., "Object Detection with Discriminatively Trained Part-Based Models", IEEE Transactions on Pattern Analysis and Machine Intelligence, vol. 32, No. 9, Sep. 2010, pp. 1627-1645.
Benenson, et al., "Ten Years of Pedestrian Detection, What Have We Learned?", Computer Vision—ECCV 2014 Workshops, Lecture Notes in Computer Science, vol. 8926, Mar. 20, 2015, pp. 613-627.
Sermanet, et al., "Pedestrian Detection with Unsupervised Multi-stage Feature Learning", Proceedings of the 2013 IEEE Conference on Computer Vision and Pattern Recognition, Jun. 25-27, 2013, Portland, Oregon, 12 pages.
Krizhevsky et al., "ImageNet Classification with Deep Convolutional Neural Networks", Advances in Neural Information Processing Systems 25 (NIPS 2012), Dec. 3-8, 2012, Lake Tahoe, Nevada, 9 pages.
Girshick et al., "Reich Feature Hierarchies for Accurate Object Detection and Semantic Segmentation", 2014 IEEE Conference on Computer Vision and Pattern Recognition, Jun. 24-27, 2014, Columbus, Ohio, 21 pages.
Taigman et al., "DeepFace: Closing the Gap to Human-Level Performance in Face Verification", 2014 IEEE Conference on Computer Vision and Pattern Recognition, Jun. 24-27, 2014, Columbus, Ohio, 8 pages.
Farabet et al., "Learning Hierarchical Features for Scene Labeling", IEEE Transactions on Pattern Analysis and Machine Intelligence, vol. 35, No. 8, Aug. 2013, pp. 1915-1929.
Paisitkriangkrai et al., "Pedestrian Detection with Spatially Pooled Features and Structured Ensemble Learning", accessed at: arxiv.org/pdf/1409.5208v3.pdf, last updated Jun. 28, 2015, 19 pages.
Cai et al., "Learning Complexity-Aware Cascades for Deep Pedestrian Detection", accessed at: arxiv.org/pdf/1507.05348v1.pdf, last updated Jul. 19, 2015, 9 pages.
Hosang et al., "Taking a Deeper Look at Pedestrians", 2015 IEEE Conference on Computer Vision and Pattern Recognition, Jun. 8-10, 2015, Boston, Massachusetts, pp. 4073-4082.
Matan et al., "Multi-Digit Recognition Using a Space Displacement Neural Network", Advances in Neural Information Processing Systems 4 (NIPS 1991), Dec. 2-5, 1991, Denver, Colorado, 8 pages.
Long et al., "Fully Convolutional Networks for Semantic Segmentation", accessed at: arxiv.org/pdf/1411.4038v2.pdf, last updated Mar. 8, 2015, 10 pages.
Simonyan et al., "Very Deep Convolutional Networks for Large-Scale Image Recognition", 3rd International Conference on Learning Representations, May 7-9, 2015, San Diego, California, 14 pages.

* cited by examiner

FULLY CONVOLUTIONAL PYRAMID NETWORKS FOR PEDESTRIAN DETECTION

RELATED APPLICATION

This patent application is a U.S. National Phase Application under 35 U.S.C. § 371 of International Application No. PCT/CN2015/097534, filed Dec. 16, 2015, entitled FULLY CONVOLUTIONAL PYRAMID NETWORKS FOR PEDESTRIAN DETECTION.

FIELD OF THE INVENTION

Embodiments the present invention relate to the field of object (e.g., pedestrian) detection; more particularly, embodiments of the present invention relate to pedestrian detection using multi-scale pyramid inputs and a fully convolutional network (FCN).

BACKGROUND OF THE INVENTION

Given a static image or a video, the basic goal of pedestrian detection is to automatically and accurately locate the positions of human body instances appeared in the image plane. It has many important applications including surveillance, autonomous driving, social robotics, animations for gaming and the caring for the elderly. Consequently, developing automated vision systems for effective pedestrian detection is attracting ever growing attention in both academic and industrial fields.

Pedestrian detection has been an active research area in computer vision for a few decades. It has served as the playground to explore ideas for generic object detection tasks. Existing methods for pedestrian detection can be grouped into three solution families: (1) Deformable Part Models (DPM) and its invariants; (2) boosting with cascaded decision trees; and (3) Convolutional Neuron Networks (CNN). To get good accuracy, the first two solution families usually use complicated hand-crafted features such as HOG (Histograms of Oriented Gradients) and an ensemble of local classifiers. Furthermore, most of them rely on sliding window detection paradigm in which approximately 1000K candidate windows should be scanned even for a 640×480-pixel image. This places a heavy computational burden on offline trained detectors.

In the most recent three years, deep CNN based methods have demonstrated completely leading performance in many popular computer vision tasks such as object classification, generic object detection, face recognition, image segmentation, and so forth.

Available CNN related methods primarily address pedestrian detection in three different ways: (1) CNN is just used as the feature pool for augmenting feature selection; (2) CNN is employed to refine the output results of traditional pedestrian detectors; and (3) CNN serves as the primary solution to handle pedestrian detection. However, the performance of known such kind of methods does not reach to the state-of-the-art. Furthermore, they still use sliding window detection paradigm. That is, in pedestrian detection, these methods historically underperform the best known traditional methods. The improved performance is only manifested in the works of using CNNs to augment input features for boosting or refining the outputs of traditional pedestrian detectors.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A Fully Convolutional Pyramid Network (FCPN) technique for pedestrian detection is disclosed. In contrast to available CNN-related pedestrian detection methods, the FCPN-based technique disclosed herein has three aspects. First, contrary to traditional CNNs which need to resize every candidate image window into a fixed size, a first present transfer learning guided Fully Convolutional Networks (FCN) architecture is present, and is built on the property of translation invariance. This enables it to directly operate on a source image of any size and provide detection results in the form of a heat map consisting of probability scores for pedestrian detection. Second, the FCNs are combined with multi-scale pyramid inputs, thus the difficulty of changing human body sizes is well resolved. Third, to improve the capability of final FCPN model in discriminating true pedestrian instances from cluttered backgrounds, an Incremental Multi-Staged Hard Negative Mining (IMSHNM) technique is designed for model fine-tuning. By integrating these components into a unified framework, an efficient and accurate FCPN-based pedestrian detection system is obtained.

Note that the terms "pedestrian" and "human body" may be used interchangeably throughout this document, and includes parts thereof, and these terms are not limited to full bodies.

Note also that the techniques described herein are not limited to pedestrian detection and may be used to handle other object detection tasks, such as, for example, but not limited to, car, pet, face, etc.

In one embodiment, the network architecture directly operates on any sized input image with one single run. This allows it to be considerably faster than other CNN related methods because the input image does not have to be processed into many candidate image patches (e.g., several thousand or even more) with particular size expected by the CNN.

Figure 1:
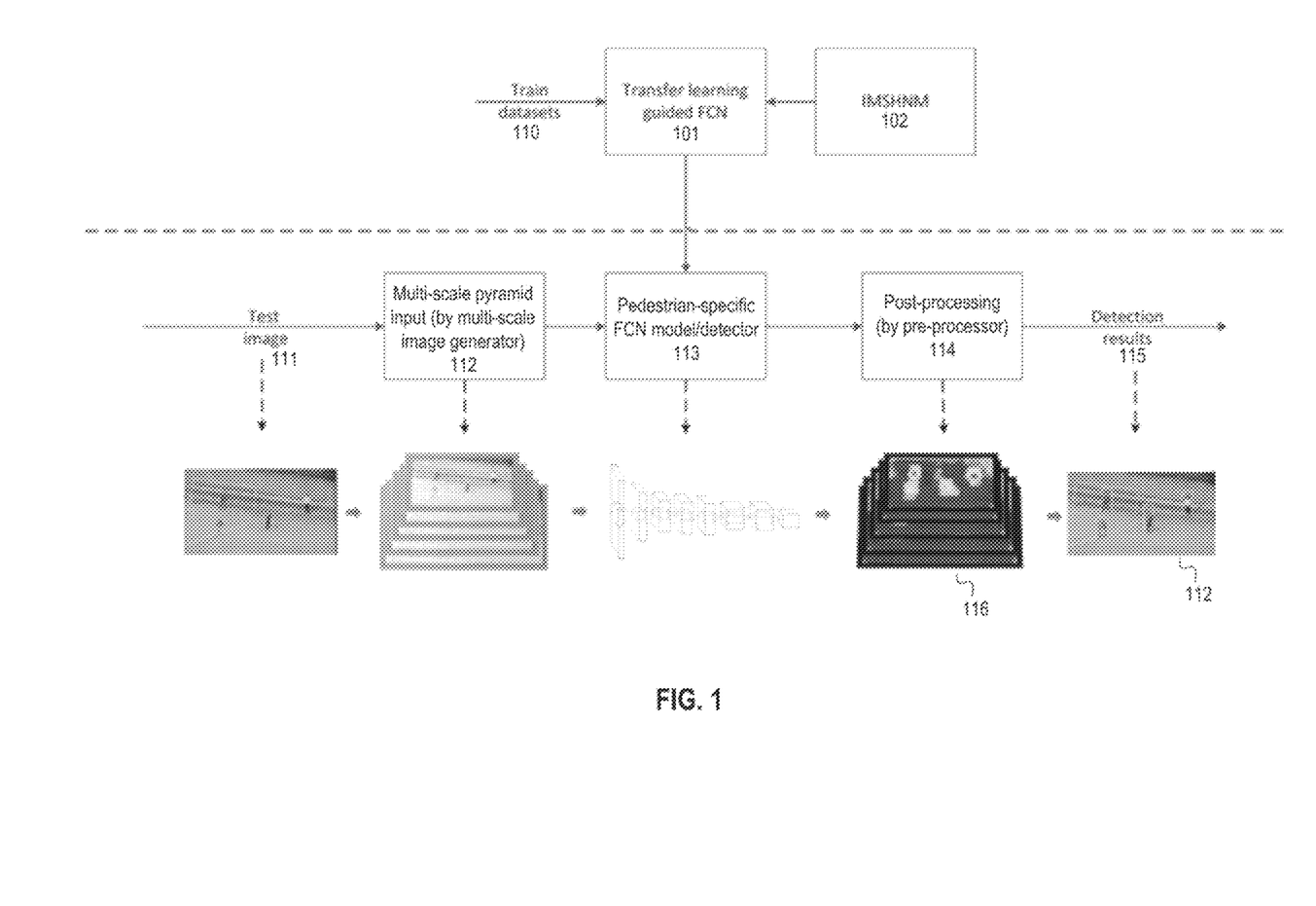
FIG. 1 is a data flow diagram of one embodiment of a pedestrian detection system.

FIG. 1 illustrates one embodiment of a pipeline of a FCPN-based pedestrian detection system (including training and testing). Referring to FIG. 1, a transfer learning guided FCN 101 is trained based on training data sets 110 feed to FCN 101 as well as fine tuning inputs from HMSHNM 102, which improves the capability of final FCPN model in discriminating true human body instances from cluttered backgrounds.

In one embodiment, transfer learning guided FCN 101 is built on the property of translation invariance which allows it to operate on an image of any size. This is contrary to traditional CNNs that need to resize every candidate image window into a fixed size. In one embodiment, after fine tuning based on inputs from HMSHNM 102, transfer learning guided FCN 101 is used as the pedestrian-specific FCN model 113 to perform feature detection and provide a heat map consisting of probability scores for pedestrian detection for each received input image.

When performing feature detection, an input image 111 is received and multi-scale pyramid inputs 112 are created from input image 111. Multi-scale pyramid inputs 112 are fed into pedestrian-specific FCN model 113. In order to generate the multi-scale pyramid inputs, the system can set the number of scales (e.g. 5), a maximum image scale, a minimum image scale and an automatically computed scale ratio for each input image. In one embodiment, the scale ratio between two neighboring levels of the pyramid is set to $\sqrt{2}$ and it falls in the range of 0.5 to 2 (to the size of original image). The combination of FCNs 113 with multi-scale pyramid inputs 112 enables the pedestrian detection system to handle changing human body sizes that might exist in various input images. Detection results are output from FCN 113 in response to each of multi-scale pyramid inputs 112 being feed into FCN 113. In one embodiment, the detection results output from FCN 113 in response to each input from multi-scale pyramid inputs 112 is a heat map representing probability scores.

The detection results (e.g., heat maps 116) output from FCN 113 and based on input image 111 are subject to post processing 114 to create the system detection results 115 that are output. In one embodiment, system detection results 115 is one image with markers (e.g., bounding boxes) indicating potential pedestrians.

Each of the components of detection system are described in greater detail below.

Transfer Learning Guided Fully Convolutional Networks

To have a canonical deep learning based pedestrian detection system whose performance is on par with or superior to the state-of-the-art, the canonical deep learning based pedestrian detection disclosed herein handles changing human body sizes and cluttered backgrounds.

The transfer learning guided Fully Convolutional Networks (FCN) is mainly designed to address redundant computation. Note that a standard CNN has two parts: convolutional layers and fully connected layers. In object detection, traditional CNN based methods need to resize every candidate image window into a fixed size. This is due to the fixed length of the input of fully connected layers because the convolutional layers can directly operate on the whole source image in a sliding window manner. In one embodiment, the pedestrian detection system operates fully connected layers in a similar way to that of convolutional layers to perform pedestrian detection in a straightforward way.

In one embodiment, transfer learning guided FCN 101 is created by performing two main operations: (1) pre-train a standard CNN model over a large classification dataset (e.g., 1000-category ImageNet data); and (2) perform a number of replacements that include replacing all fully connected layers with 1×1 fully convolutions, considering fully connected operation as a single convolution at fixed input just as defined in Eq. 1 and Eq. 2 below and replacing the multi-category classifier with a binary pedestrian classifier, and then perform fine-tuning on pedestrian dataset.

While a 1×1 fully convolution itself is not new, the use of a present transfer learning guided FCN for pedestrian detection is new.

In one embodiment, the transfer learning guided FCN is built on translation invariance. Mathematically, let $x_{i,j}$ be the input data at location (i,j) for an arbitrary layer, the respective output $y_{i,j}$ is computed as $$y_{ij} = f_{ks}(\{x_{si+\Delta si, sj+\Delta sj}\}_{0 \leq \Delta si, \Delta sj \leq k}), \quad (1)$$

where k is the kernel size, s is the stride, and $f_{ks}$ is the activation function (e.g., convolution, average pooling, max pooling, etc.). FCN is defined in terms of (1) under composition, with kernel size and stride obeying the transformation rule.

$$f_{ks} \circ g_{k's'} = (f \circ g)_{k'+(k-1)s', ss'}. \quad (2)$$

Figure 2:
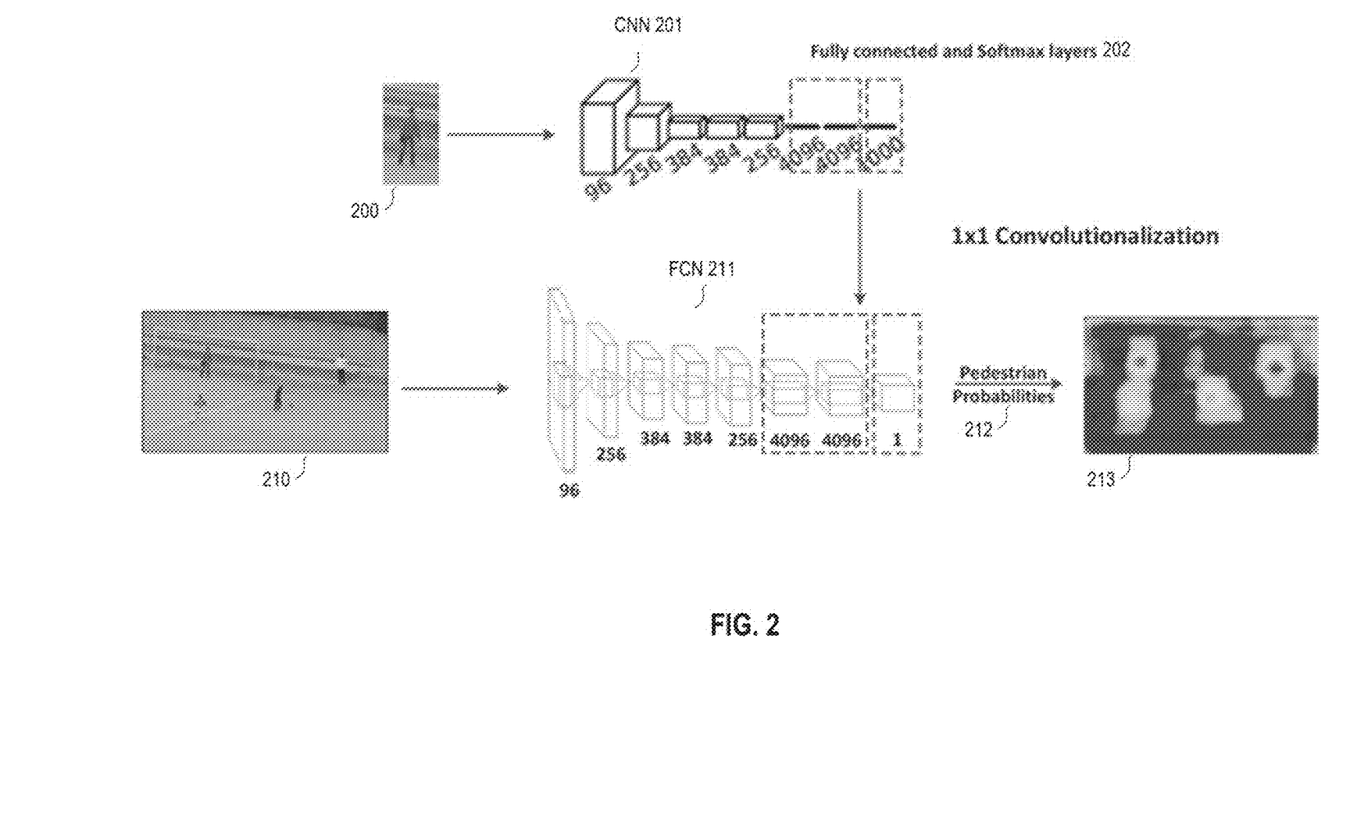
FIG. 2 illustrates one embodiment of a process for transforming a 1000-category classification network to a pedestrian-specific FCN.

FIG. 2 illustrates one embodiment of a process for transforming a 1000-category classification network to pedestrian-specific FCN.

The difference between fully connected layers and convolution layers is that the neurons in the convolution layer are connected only to a local region in the input, and that many of the neurons in a convolution volume share neurons. However, the neurons in both fully connected and convolution layers still compute dot products, so their functional forms are identical. Therefore, in one embodiment, a conversion is made between fully connected layers and convolution layers as follows:

(1) For any convolution layer, there is a fully connected layer that implements the same forward function. In one embodiment, the weight matrix is a large matrix that is mostly zero except for at certain blocks (due to local connectivity) where the weights in many of the blocks are equal (due to parameter sharing); and (2) Conversely, any fully connected layer can be converted to a convolution layer. Taking AlexNet as an example, the first fully connected layer with 4096 output units that is looking at some input volume of size 6×6×256 can be equivalently expressed as a convolution layer with 6×6×256 kernel size and 4096 output channels. In other words, the filter size is set to be exactly the size of the input volume, and hence the output will simply be 1×1×4096 since only a single depth column fits across the input volume, giving identical result as the initial fully connected layer. For more information on AlexNet, see A. Krizhevsky, et al., ImageNet classification with deep convolutional neural networks, In *Advances in Neural Information Processing Systems,* 2012.

After transforming fully connected layers to convolution layers, the network can be viewed as a sequence of convolution operations and operates on input images of any size, producing output results accordingly.

As shown in FIG. 2, in one embodiment, fully connected and softmax layers 202 of CNN 201, including the last two fully connected layers, undergo the 1×1 convolutionalization described above, and that its 1000-category classifier is replaced with a binary pedestrian classifier. Then the fine-tuning on pedestrian dataset (as described below) is performed to create FCN 211. Thus, while CNN 201 is able to be fed a portion of an image, namely image 200, FCN 211 is able to be fed any sized image, such as image 210 which contains image 200, and produce pedestrian probabilities 212 (e.g., probability scores) to create a heat map 213 (where color is used to represent different levels of probability scores).

Incremental Multi-Stage Hard Negative Mining

In one embodiment, after the conversion process, the transfer learning guided FCN undergoes a fine tuning process. This is an additional training process. In one embodiment, the fine-tuning process of transfer learning guided FCN changes to FCN to improve its ability to discriminate true human body instances from cluttered backgrounds. One embodiment of this process is referred to herein as Incremental Multi-Stage Hard Negative Mining (IMSHNM) and it is designed to improve the discrimination of the final model.

Figures 3, 4A, 4B:
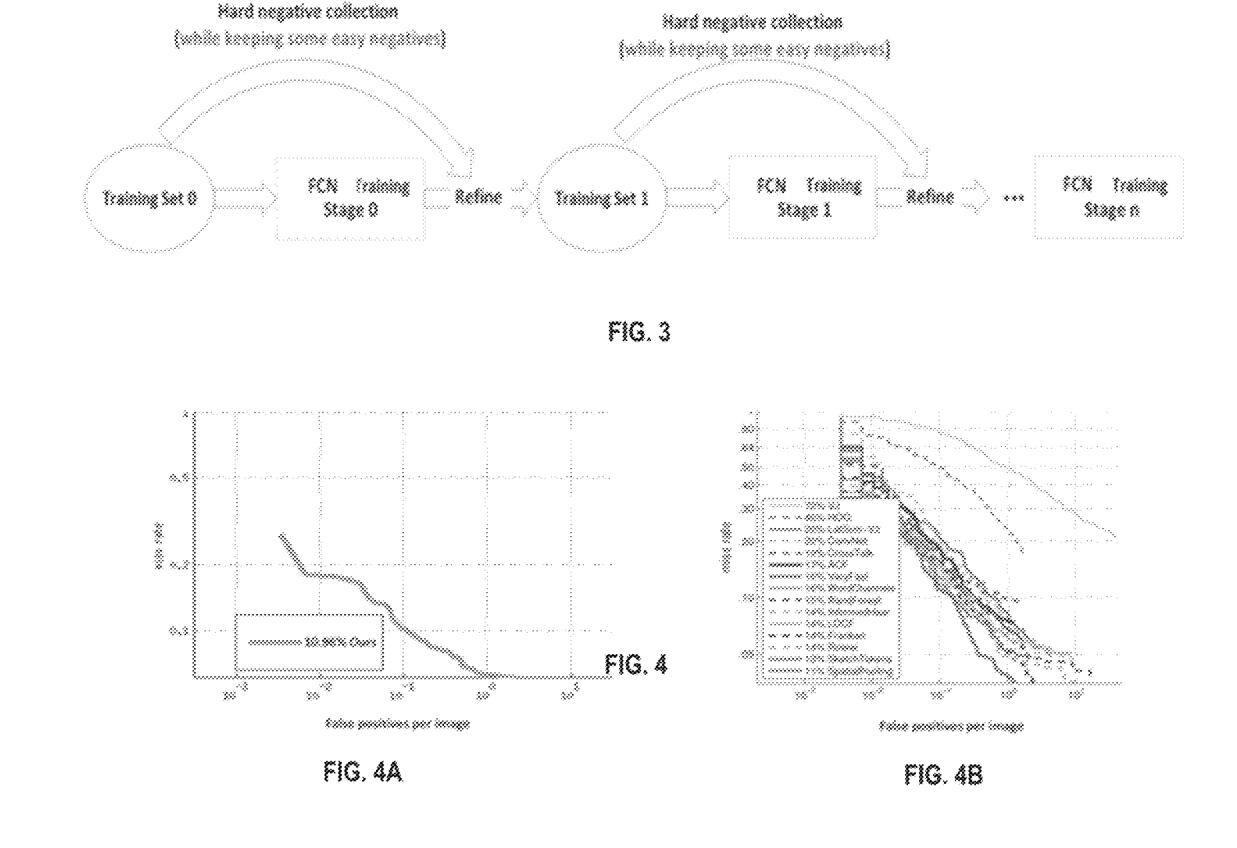
FIG. 3 is a flow diagram of one embodiment of the IMSHNM process.
FIGS. 4A and 4B illustrate a comparison of ROC curves on the INRIA person dataset.

FIG. 3 is a flow diagram of one embodiment of the IMSHNM process. The main idea of IMSHNM is to enhance the discrimination of the pedestrian-specific FCN model through an incremental multi-phase learning. At each learning phase, the most offending negative samples are automatically collected and used to be part of training set for next learning phase. In one embodiment, the most offending negative samples are those misclassified, based on classification score, as positive samples in the previous learning phase. These negative samples are collected and reused in the next learning phase by assigning with large penalty weights, so that the next learning phase pays more attention on discriminating these negative samples from true positives. Different from traditional bootstrap, some easy negative samples are also kept in the next training phase. In one embodiment, the easy negative samples are those accurately classified as negative samples with high confidence scores in the previous learning phase. In one embodiment, 10% of negative training samples are kept in the next training phase, to be same to the easy negative samples in the previous learning phase. This helps achieve good discrimination and generalization.

In one embodiment, the training conducted in the same way as in the prior art with the difference under samples in the training set at each learning phase.

In the experiments, 3000 negative samples are extracted at each learning phase and the number of most offending answers is limited to 5 for each image. In one embodiment, in fine-tuning the FCN model, 3-5 learning phases are performed (in addition to the original training phase). This is usually enough to obtain favorable detection accuracy.

After performing the IMSHNM-based fine tuning process, the resulting FCN is the pedestrian-specific FCN model that is used for pedestrian detection.

Multi-Scale Pyramid Inputs

In real scenarios, the human body size may change frequently, which implies that direct running of FCN model over the original image may not have high detection accuracy. To solve this problem, the pedestrian-specific FCN is combined with the idea of pyramid (as shown in the bottom row of FIG. 1). This kind of combination is referred to herein as Fully Convolutional Pyramid Networks (FCPN), which allows for pedestrian detection at multiple scales while the corresponding FCN model is designed and trained at one single scale.

In one embodiment, to construct multi-scale pyramid inputs for the pedestrian-specific FCN model, the input image is resized to several different scales (e.g., 5 scales) which are fed into the pedestrian-specific FCN model. By changing the number of scales, the accuracy can change. For example, using more than 5 scales can improve accuracy, while using less than 5 scales can reduce accuracy. In experiments, the scale ratio between two neighboring levels of the pyramid is set to $\sqrt{2}$ and it falls in the range of 0.5 to 2 (to the size of original image).

Post-Processing

In one embodiment of the pedestrian detection system, once the multi-scale detection results (e.g., heat maps) are computed with the well-trained FCPN model in response to the multi-scale pyramid inputs generated from any input image, post-processing is performed (via a post processor). One goal of post-processing is to obtain more accurate detection results with least number of object boxes.

Figure 6:
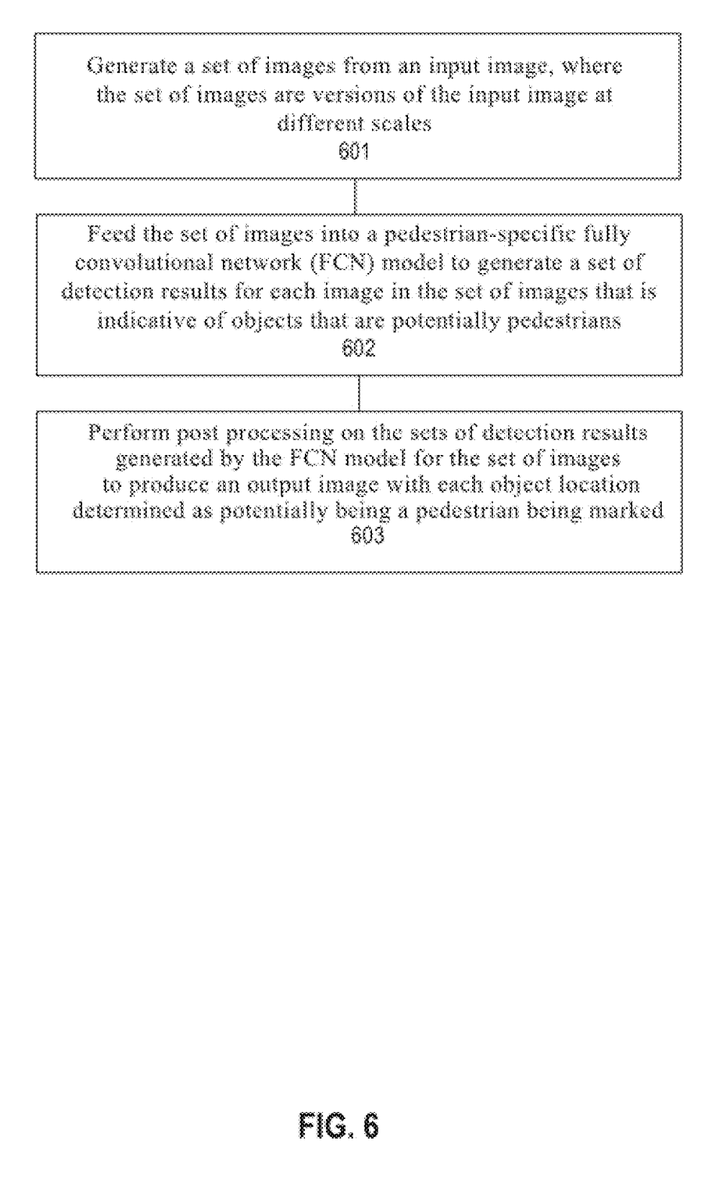
FIG. 6 is a flow diagram of one embodiment of a process for pedestrian detection.

In one embodiment, the post-processing includes two main operations: (1) Non-Maximum Suppression (NMS) and (2) Bounding Box Regression (BBR), which are well-known in the art. NMS and BBR are two common techniques popularly used in object detection. In one embodiment, the pedestrian detection system, a set of initial bounding boxes is obtained by setting a threshold to the multi-scale heat maps. That is, in one embodiment, only bounding boxes with probability/classification scores larger than a fixed threshold are considered as initial bounding boxes, i.e., candidates. This is based on training results, e.g., a box with classification score >0.5, is considered a potential pedestrian instance. However, many of those object boxes can be overlapped. With NMS, the object boxes are first sorted to create a list with descending classification/probability scores, where each box only has one unique classification score. Then, the overlap rates between the object box with the highest score and the other object boxes are computed, and those highly overlapped boxes (e.g., >0.5 overlap) with lower scores as disclosed. In one embodiment, the object box with the highest score is taken as reference, and any other object boxes that have overlaps >0.5 with the reference box are all discarded, as their scores are lower than that of the reference box. Finally, this object box with the highest score is saved as the first result box. This procedure is iteratively run on the remained object boxes until no more object box can be found. As a result, only a small number of object boxes are finally obtained. Note that above described post-processing operations are disclosed extensively in the literature. As shown in FIG. 6, heat map, for example, will generate many candidate boxes, but only one is needed for each pedestrian instances.

After performing NMS, the system uses BBR to refine the positions and scales of those object boxes. The refined object boxes are output as the final detection results.

Performance Comparison

The INRIA person dataset was used, which has served as a dominant benchmark for image based pedestrian detection, to validate the performance of the techniques disclosed herein against the current state-of-the-art. The standard detection error was followed, which is measured as miss rate under 0.1 False Positives Per Image (FPPI). In the experiments, the disclosed FCPN models are pre-trained with two popular networks known as AlexNet and VGGNet. The first set of experiments is implemented to show the effectiveness of the IMSHNM process in model fine-tuning. Table 1 summarizes the comparative results. As shown, the respective miss rate for the FCPN models pre-trained with AlexNet and VGGNet is decreased by 23.6% and 85.1% by using the IMSHNM in model fine-tuning, while the disclosed method achieves the best known miss rate of 10.96% under 0.1 false positives per image (de facto standard).

Figure 5:
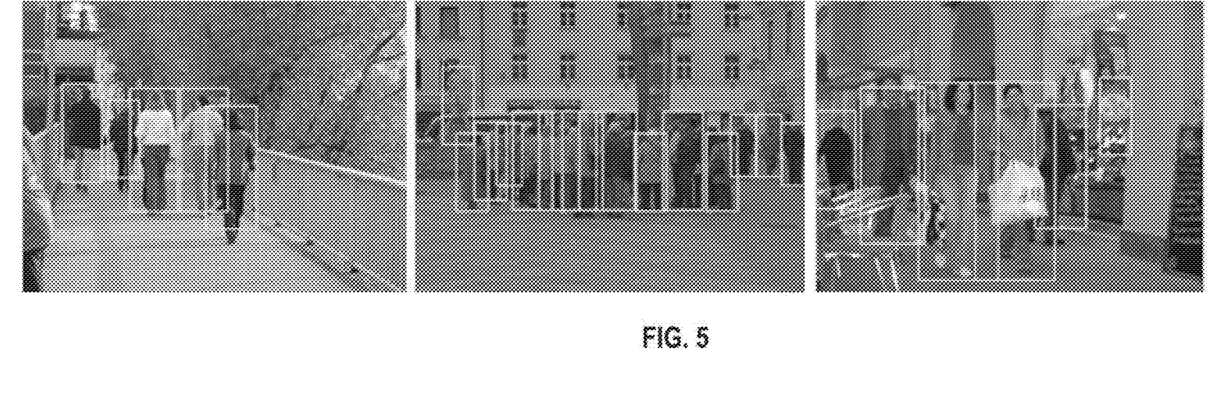
FIG. 5 illustrates example detection results from using the techniques described herein on the INRIA person dataset.

In the second set of experiments, the result of one model created with the techniques described herein with those from other pedestrian detectors, and the error curves are shown in FIG. 4. It is clear that the disclosed method reaches the state-of-the-art performance. FIG. 5 further presents some example detection results to illustrate the efficacy of the methodology disclosed herein. With Nvidia Titan X GPU, the novel FCPN models pre-trained with VGGNet/AlexNet can process 0.5/2.1 images per second, which is considerably fast than other CNN related methods.

TABLE 1

Results on the INRIA person dataset.

| Models | Miss Rate (under 0.1 FPPI) |
|---|---|
| FCPN pre-trained with AlexNet | 47.3% |
| FCPN pre-trained with AlexNet + fine-tuned with IMSHNM | 23.7% |
| FCPN pre-trained with VGGNet | 96.1% |
| FCPN pre-trained with VGGNet + fine-tuned with IMSHNM | 10.96% |

Thus, a new FCPN technology which combines transfer learning guided Fully Convolutional Networks (FCN), multi-scale pyramid inputs and an Incremental Multi-Stage Hard Negative Mining (IMSHNM) fine-tuning process into a unified framework for robust pedestrian detection has been disclosed. Compared with existing CNN related pedestrian detection methods, the FCPN technology has the advantages of better discrimination, leading accuracy and fast speed. Embodiments of such a technology has many advantages, including (1) providing a software stack for human body based visual analytics applications including surveillance, social robots, autonomous vehicles, gaming and entertainment, the caring for the elderly, and so forth.

(2) providing a software/hardware stack complementary to camera phone platforms, (3) providing an addition to other camera embedded/wearable devices, e.g., smart phone, tablet, laptop, phablet, Chromebook, PC, wearable devices, smart-TV, game-console and web server.

Note that if detecting objects other than pedestrians, the pedestrian specific classifier is changed to an object-specific classifier (i.e., a classifier for the specific object for which detection is being performed).

FIG. 6 is a flow diagram of one embodiment of a process for pedestrian detection in an input image. The process is performed by processing logic that may comprise hardware (circuitry, dedicated logic, etc.), software (such as is run on a general purpose computer system or a dedicated machine), firmware, or a combination of these three.

Referring to FIG. 6, the process begins by generating a set of images from an input image, where the set of images are versions of the input image at different scales (processing block 601). In one embodiment, the input image is a full-size image and the set of images comprises multi-scale pyramid inputs derived from the input image.

After generating the set of images of different scales from the input image, processing logic feeds the set of images into a pedestrian-specific fully convolutional network (FCN) model to generate a set of detection results for each image in the set of images that is indicative of objects that are potentially pedestrians (processing block 602). In one embodiment, the detection results output from the pedestrian-specific FCN model for each image in the set of images comprises heat maps. In one embodiment, the detection results output from the pedestrian-specific FCN model for each image in the set of images is a plurality of probability scores for a plurality of positions in each image.

In one embodiment, the pedestrian-specific FCN model is generated from a transfer learning guided FCN initially trained using multi-category image dataset (e.g., 1000-category ImageNet dataset) followed by performing a fine-tuning process that is based on pedestrian data. In one embodiment, the fine tuning process comprises a multi-phase learning process in which the training set for training the transfer learning guided FCN is refined in each phase after an initial learning phase in the multi-phase learning process, wherein refining the training set is performed using a group of negative samples containing a subgroup of most offending negative samples and a subgroup of a portion of less offending negative samples.

After outputting detection results from the pedestrian-specific FCN model, processing logic performs post processing on the sets of detection results generated by the FCN model for the set of images to produce an output image with each object location determined as potentially being a pedestrian being marked (processing block 603). The marks used to mark the pedestrians may comprise bounding boxes, highlighting, pointers, etc. In one embodiment, performing post processing comprises performing non-maximum suppression. In another embodiment, performing post processing comprises performing bounding box regression. In yet another embodiment, performing post processing comprises performing non-maximum suppression and performing bounding box regression.

Figure 7:
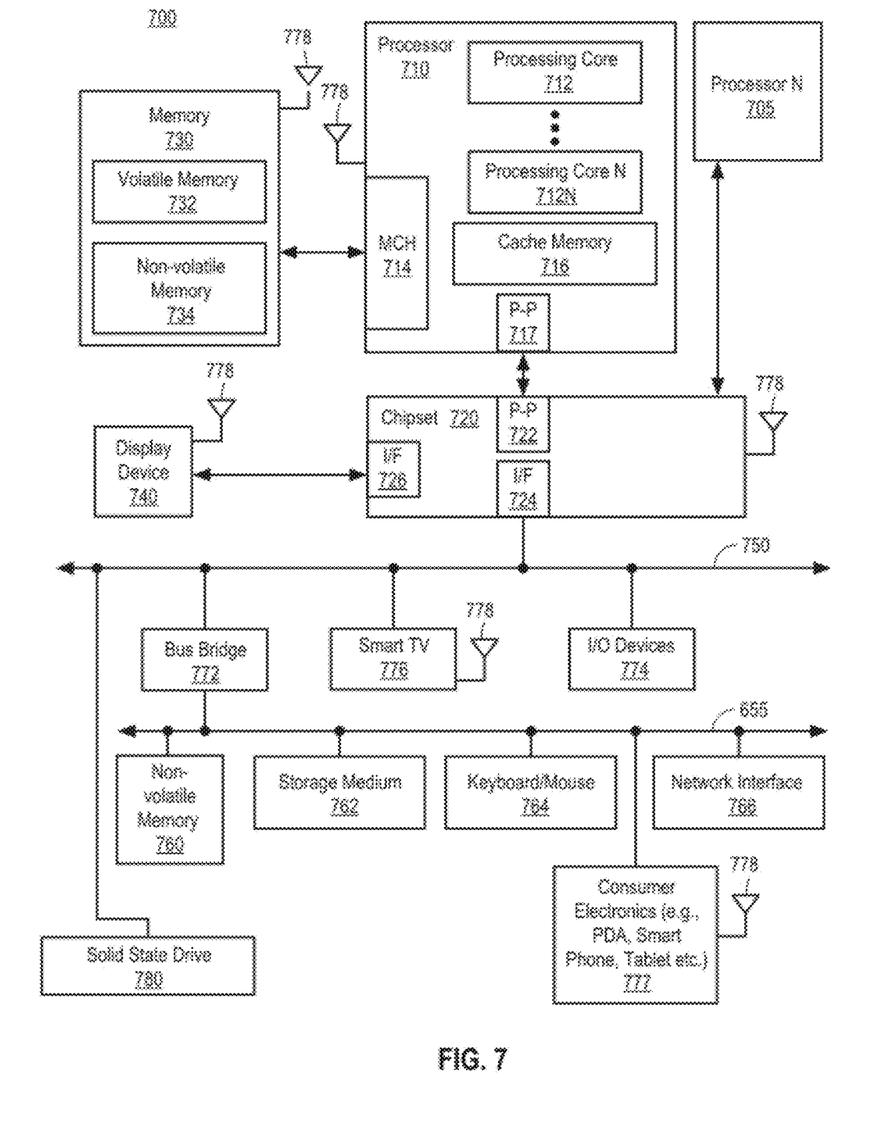
FIG. 7 is a block diagram of one embodiment of a computing system.

FIG. 7 is one embodiment of a system level diagram 700 that may incorporate the techniques described above. For example, the techniques described above may be incorporated into a processor in system 700.

Referring to FIG. 7, system 700 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 700 implements the methods disclosed herein and may be a system on a chip (SOC) system.

In one embodiment, processor 710 has one or more processor cores 712 to 712N, where 712N represents the Nth processor core inside the processor 710 where N is a positive integer. In one embodiment, system 700 includes multiple processors including processors 710 and 705, where processor 705 has logic similar or identical to logic of processor 710. In one embodiment, system 700 includes multiple processors including processors 710 and 705 such that processor 705 has logic that is completely independent from the logic of processor 710. In such an embodiment, a multi-package system 700 is a heterogeneous multi-package system because the processors 705 and 710 have different logic units. In one embodiment, processing core 712 includes, but is not limited to, pre-fetch logic to fetch instructions, decode logic to decode the instructions, execution logic to execute instructions and the like. In one embodiment, processor 710 has a cache memory 716 to cache instructions and/or data of the system 700. In another embodiment of the invention, cache memory 716 includes level one, level two and level three, cache memory, or any other configuration of the cache memory within processor 710.

In one embodiment, processor 710 includes a memory control hub (MCH) 714, which is operable to perform functions that enable processor 710 to access and communicate with a memory 730 that includes a volatile memory 732 and/or a non-volatile memory 734. In one embodiment, memory control hub (MCH) 714 is positioned outside of processor 710 as an independent integrated circuit.

In one embodiment, processor 710 is operable to communicate with memory 730 and a chipset 720. In such an embodiment, SSD 780 executes the computer-executable instructions when SSD 780 is powered up.

In one embodiment, processor 710 is also coupled to a wireless antenna 778 to communicate with any device configured to transmit and/or receive wireless signals. In one embodiment, wireless antenna interface 778 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 734 includes, but is not limited to, flash memory (e.g., NAND, NOR), phase change memory (PCM), read-only memory (ROM), electrically erasable programmable read-only memory (EEPROM), or any other type of non-volatile memory device.

Memory 730 stores information and instructions to be executed by processor 710. In one embodiment, chipset 720 connects with processor 710 via Point-to-Point (PtP or P-P) interfaces 717 and 722. In one embodiment, chipset 720 enables processor 710 to connect to other modules in the system 700. In one embodiment, interfaces 717 and 722 operate in accordance with a PtP communication protocol such as the Intel QuickPath Interconnect (QPI) or the like.

In one embodiment, chipset 720 is operable to communicate with processor 710, 705, display device 740, and other devices 772, 776, 774, 760, 762, 764, 766, 777, etc. In one embodiment, chipset 720 is also coupled to a wireless antenna 778 to communicate with any device configured to transmit and/or receive wireless signals.

In one embodiment, chipset 720 connects to a display device 740 via an interface 726. In one embodiment, display device 740 includes, but is not limited to, liquid crystal display (LCD), plasma, cathode ray tube (CRT) display, or any other form of visual display device. In addition, chipset 720 connects to one or more buses 750 and 755 that interconnect various modules 774, 760, 762, 764, and 766. In one embodiment, buses 750 and 755 may be interconnected together via a bus bridge 772 if there is a mismatch in bus speed or communication protocol. In one embodiment, chipset 720 couples with, but is not limited to, a non-volatile memory 760, a mass storage device(s) 762, a keyboard/mouse 764, and a network interface 766 via interface 724, smart TV 776, consumer electronics 777, etc.

In one embodiment, mass storage device 762 includes, but is not limited to, a solid state drive, a hard disk drive, a universal serial bus flash memory drive, or any other form of computer data storage medium. In one embodiment, network interface 766 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 7 are depicted as separate blocks within the system 700, the functions performed by some of these blocks may be integrated within a single semiconductor circuit or may be implemented using two or more separate integrated circuits.

In a first example embodiment, a visual object detection system comprises a multi-scale image generator to generate a set of images from an input image, the set of images being versions of the input image at different scales; a object-specific fully convolutional network (FCN) model operable to generate a set of detection results for each image in the set of images that is indicative of objects that are potentially of a specific object type; and a post processor to combine sets of detection results generated by the FCN model for the set of images into an output image with marks for each object location determined as potentially being the specific object type.

In another example embodiment, the subject matter of the first example embodiment can optionally include that the object-specific FCN model is generated from a transfer learning guided FCN initially trained using multi-category image dataset followed by application of a fine-tuned process that is based on data of the specific object type.

In another example embodiment, the subject matter of the first example embodiment can optionally include that the fine tuning process comprises a multi-phase learning process in which the training set for training the transfer learning guided FCN is refined in each phase after an initial learning phase in the multi-phase learning process, wherein refining the training set is performed using a group of negative samples containing a subgroup of most offending negative samples and a subgroup of a portion of less offending negative samples, where negative samples are classified as the specific object type.

In another example embodiment, the subject matter of the first example embodiment can optionally include that the set of images comprises multi-scale pyramid inputs.

In another example embodiment, the subject matter of the first example embodiment can optionally include that the detection results output from the human body-specific FCN model for each image in the set of images comprise heat maps.

In another example embodiment, the subject matter of the first example embodiment can optionally include that the detection results output from the object-specific FCN model for each image in the set of images is a plurality of probability scores for a plurality of positions in each image.

In another example embodiment, the subject matter of the first example embodiment can optionally include that the input image is a full-size image.

In another example embodiment, the subject matter of the first example embodiment can optionally include that the post processor performs non-maximum suppression. In another example embodiment, the subject matter of this example embodiment can optionally include that the post processor performs bounding box regression.

In another example embodiment, the subject matter of the first example embodiment can optionally include that the object-specific fully convolutional network (FCN) model is a human body-specific FCN, and the specific object type is a human body.

In a second example embodiment, a method for detecting a visual object of a specific type in an input image comprises generating a set of images from an input image, the set of images being versions of the input image at different scales, feeding the set of images into a object-specific fully convolutional network (FCN) model to generate a set of detection results for each image in the set of images that is indicative of objects that are potentially of the specific object type, and post processing sets of detection results generated by the FCN model for the set of images into an output image with marks for each object location determined as potentially being the specific object type.

In another example embodiment, the subject matter of the second example embodiment can optionally include that the object-specific FCN model is generated from a transfer learning guided FCN initially trained using multi-category image dataset followed by performing a fine-tuning process that is based on data of the specific object type.

In another example embodiment, the subject matter of the second example embodiment can optionally include that the fine tuning process comprises a multi-phase learning process in which the training set for training the transfer learning guided FCN is refined in each phase after an initial learning phase in the multi-phase learning process, wherein refining the training set is performed using a group of negative samples containing a subgroup of most offending negative samples and a subgroup of a portion of less offending negative samples, where negative samples are classified as the specific object type.

In another example embodiment, the subject matter of the second example embodiment can optionally include that the set of images comprises multi-scale pyramid inputs.

In another example embodiment, the subject matter of the second example embodiment can optionally include that the detection results output from the object-specific FCN model for each image in the set of images comprise heat maps.

In another example embodiment, the subject matter of the second example embodiment can optionally include that the detection results output from the object-specific FCN model for each image in the set of images is a plurality of probability scores for a plurality of positions in each image.

In another example embodiment, the subject matter of the second example embodiment can optionally include that the input image is a full-size image.

In another example embodiment, the subject matter of the second example embodiment can optionally include that performing post processing comprises performing non-maximum suppression. In another example embodiment, the subject matter of this example embodiment can optionally include that performing post processing comprises performing bounding box regression.

In a third example embodiment, an article of manufacture has one or more non-transitory computer readable media storing instructions which, when executed by a system, cause the system to perform a method for detecting visual objects of a specific type in an input image, where the method comprises generating a set of images from an input image, the plurality of images being versions of the input image at different scales, feeding the set of images into a object-specific fully convolutional network (FCN) model to generate a set of detection results for each image in the set of images that is indicative of objects that are potentially of a specific object type, and post processing sets of detection results generated by the FCN model for the set of images into an output image with marks for each object location determined as potentially being the specific object type.

In another example embodiment, the subject matter of the third example embodiment can optionally include that the object-specific FCN model is generated from a transfer learning guided FCN initially trained using multi-category image dataset followed by performing a fine-tuning process that is based on data of the specific object type.

In another example embodiment, the subject matter of the third example embodiment can optionally include that the fine tuning process comprises a multi-phase learning process in which the training set for training the transfer learning guided FCN is refined in each phase after an initial learning phase in the multi-phase learning process, wherein refining the training set is performed using a group of negative samples containing a subgroup of most offending negative samples and a subgroup of a portion of less offending negative samples, where negative samples are classified as the specific object type.

In another example embodiment, the subject matter of the third example embodiment can optionally include that the detection results output from the object-specific FCN model for each image in the set of images comprise heat maps.

In another example embodiment, the subject matter of the third example embodiment can optionally include that the input image is a full-size image.

In another example embodiment, the subject matter of the third example embodiment can optionally include that performing post processing comprises performing non-maximum suppression and bounding box regression.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A visual object detection system comprising:
   a multi-scale image generator to generate a set of images from an input image, the set of images being versions of the input image at different scales;
   an object-specific fully convolutional network (FCN) model operable to generate a set of detection results for each image in the set of images that is indicative of objects that are potentially of a specific object type, wherein the object-specific FCN model is generated from a transfer learning guided FCN initially that is trained, in part, by application of a fine-tuned process that is based on data of the specific object type; and
   a post processor to combine sets of detection results generated by the FCN model for the set of images into an output image with each object location determined as potentially being the specific object type.

2. The visual object detection system defined in claim 1 wherein the object-specific FCN model is generated from the transfer learning guided FCN initially trained using multi-category image dataset followed by application of the fine-tuned process that is based on data of the specific object type.

3. The visual object detection system defined in claim 2 wherein the fine tuning process comprises a multi-phase learning process in which the training set for training the transfer learning guided FCN is refined in each phase after an initial learning phase in the multi-phase learning process, wherein refining the training set is performed using a group of negative samples containing a subgroup of most offending negative samples and a subgroup of a portion of less offending negative samples, where negative samples are classified as the specific object type.

4. The visual object detection system defined in claim 1 wherein the set of images comprises multi-scale pyramid inputs.

5. The visual object detection system defined in claim 1 wherein the detection results output from the object-specific FCN model for said each image in the set of images comprises heat maps.

6. The visual object detection system defined in claim 1 wherein the detection results output from the object-specific FCN model for said each image in the set of images is a plurality of probability scores for a plurality of positions in said each image.

7. The visual object detection system defined in claim 1 wherein the input image is a full-size image.

8. The visual object detection system defined in claim 1 wherein the post processor performs non-maximum suppression.

9. The visual object detection system defined in claim 8 wherein the post processor performs bounding box regression.

10. A method for detecting a visual object of a specific type in an input image, the method comprising:
    generating a set of images from an input image, the set of images being versions of the input image at different scales;
    feeding the set of images into an object-specific fully convolutional network (FCN) model to generate a set of detection results for each image in the set of images that is indicative of objects that are potentially a specific object type, wherein the object-specific FCN model is generated from a transfer learning guided FCN initially that is trained, in part, by application of a fine-tuned process that is based on data of the specific object type; and
    post processing sets of detection results generated by the FCN model for the set of images into an output image with each object location determined as potentially being the specific object type.

11. The method defined in claim 10 wherein the object-specific FCN model is generated from the transfer learning guided FCN initially trained using multi-category image dataset followed by performing the fine-tuning process that is based on data of the specific object type.

12. The method defined in claim 11 wherein the fine tuning process comprises a multi-phase learning process in which the training set for training the transfer learning guided FCN is refined in each phase after an initial learning phase in the multi-phase learning process, wherein refining the training set is performed using a group of negative samples containing a subgroup of most offending negative samples and a subgroup of a portion of less offending negative samples, where negative samples are classified as the specific object type.

13. The method defined in claim 10 wherein the set of images comprises multi-scale pyramid inputs.

14. The method defined in claim 10 wherein the detection results output from the object-specific FCN model for said each image in the set of images is a plurality of probability scores for a plurality of positions in said each image.

15. The method defined in claim 10 wherein performing post processing comprises performing non-maximum suppression.

16. The method defined in claim 15 wherein performing post processing comprises performing bounding box regression.

17. An article of manufacture having one or more non-transitory computer readable media storing instructions which, when executed by a system, cause the system to perform a method for detecting pedestrians in an input image, the method comprising:
    generating a set of images from an input image, the plurality of images being versions of the input image at different scales;
    feeding the set of images into an object-specific fully convolutional network (FCN) model to generate a set of detection results for each image in the set of images that is indicative of objects that are potentially of a specific object type, wherein the object-specific FCN model is generated from a transfer learning guided FCN initially that is trained, in part, by application of a fine-tuned process that is based on data of the specific object type; and post processing sets of detection results generated by the FCN model for the set of images into an output image with each object location determined as potentially being the specific object type.

18. The article of manufacture defined in claim 17 wherein the object-specific FCN model is generated from the transfer learning guided FCN initially trained using multi-category image dataset followed by performing the fine-tuning process that is based on data of the specific object type.

19. The article of manufacture defined in claim 18 wherein the fine tuning process comprises a multi-phase learning process in which the training set for training the transfer learning guided FCN is refined in each phase after an initial learning phase in the multi-phase learning process, wherein refining the training set is performed using a group of negative samples containing a subgroup of most offending negative samples and a subgroup of a portion of less offending negative samples, where negative samples are classified as the specific object type.

20. The article of manufacture defined in claim 17 wherein performing post processing comprises performing non-maximum suppression and bounding box regression.

21. The method defined in claim 10 wherein the detection results output from the object-specific FCN model for said each image in the set of images comprises heat maps.

22. The method defined in claim 10 wherein the input image is a full-size image.

23. The article of manufacture defined in claim 17 wherein the detection results output from the object-specific FCN model for said each image in the set of images comprises heat maps.

24. The article of manufacture defined in claim 17 wherein the input image is a full-size image.

* * * * *